Dec. 7, 1943.   L. E. TOPHAM   2,336,049
METHOD OF MAKING LASTS
Filed July 18, 1942   10 Sheets-Sheet 1
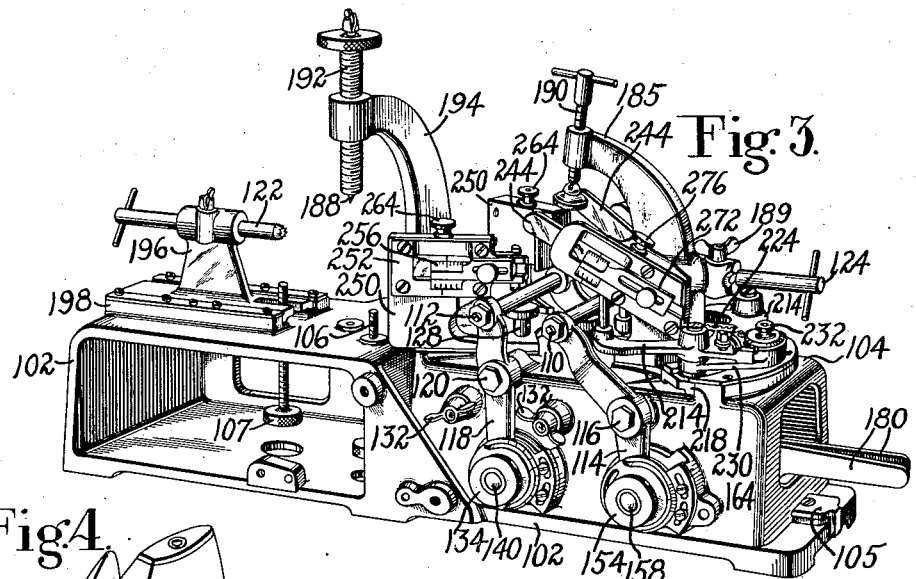
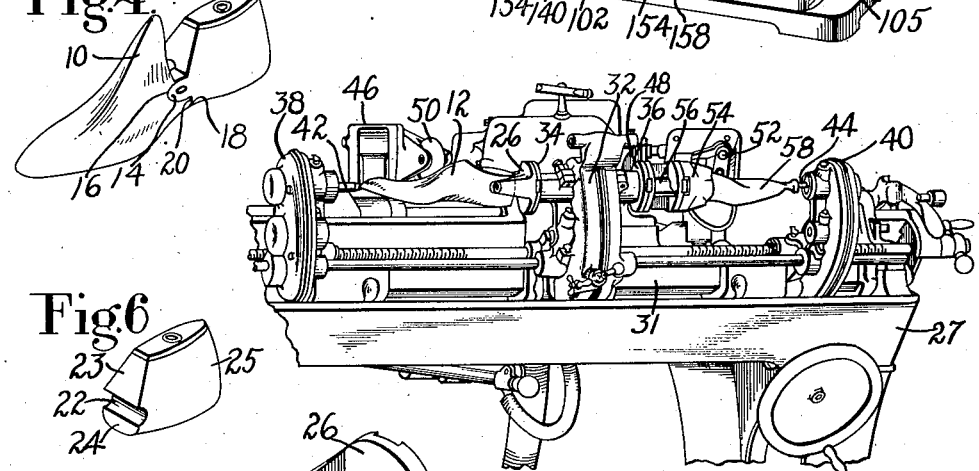
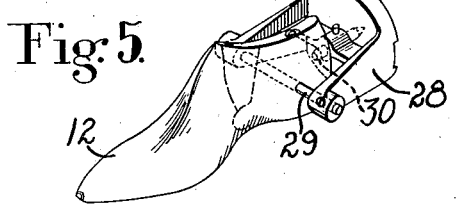
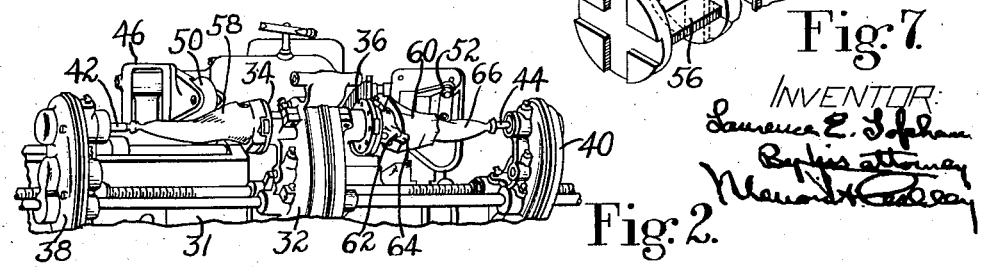

Dec. 7, 1943.   L. E. TOPHAM   2,336,049
METHOD OF MAKING LASTS
Filed July 18, 1942

Dec. 7, 1943.  L. E. TOPHAM  2,336,049
METHOD OF MAKING LASTS
Filed July 18, 1942  10 Sheets-Sheet 4
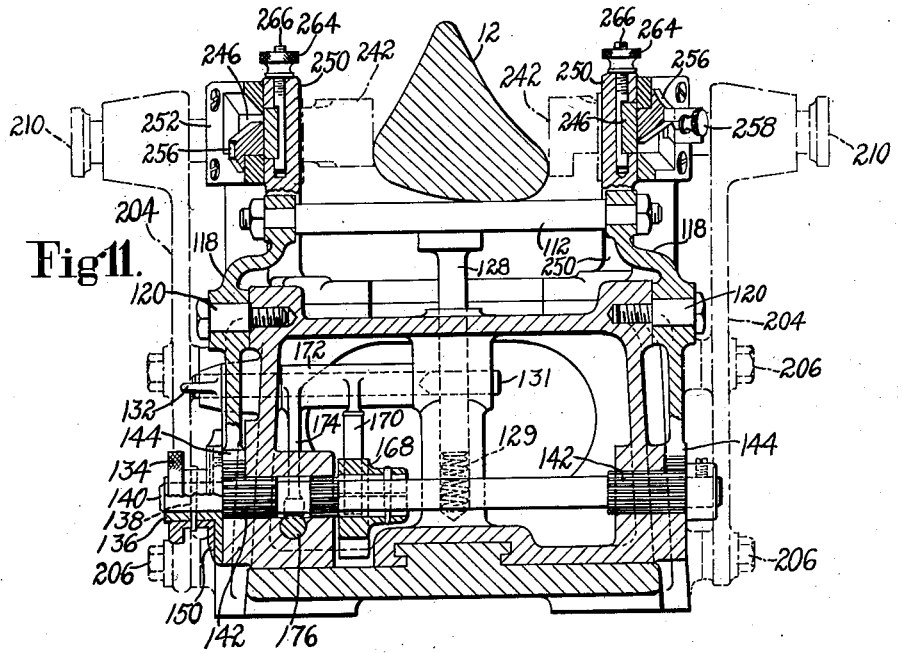
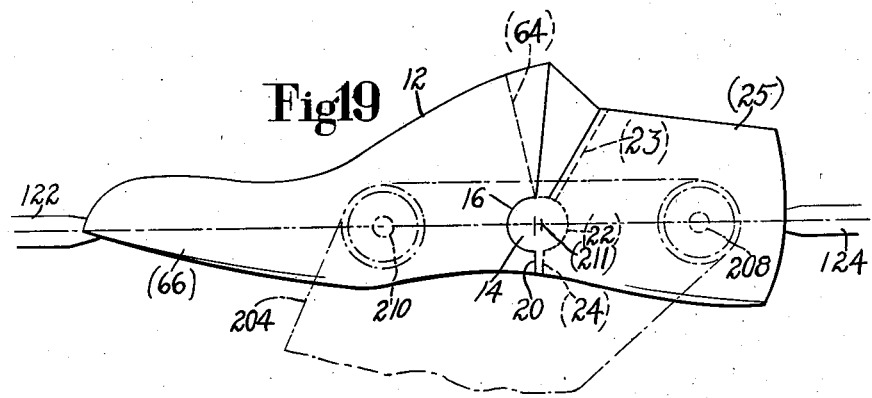
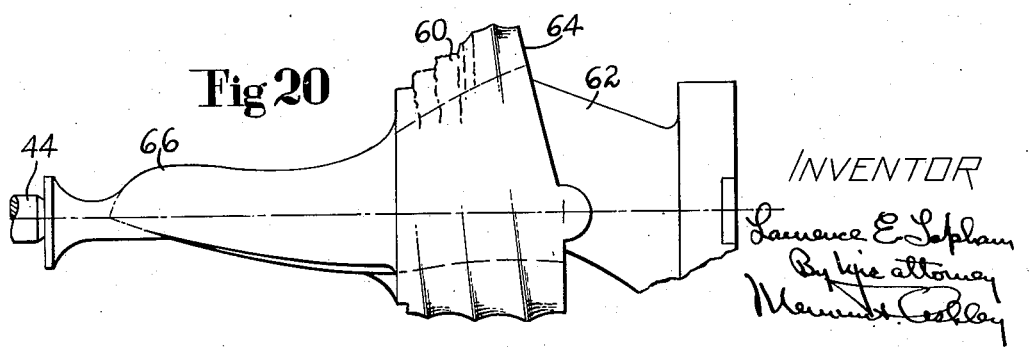
INVENTOR Dec. 7, 1943. L. E. TOPHAM 2,336,049
METHOD OF MAKING LASTS
Filed July 18, 1942 10 Sheets-Sheet 5

INVENTOR
Lawrence E. Topham
By his attorney

Dec. 7, 1943.　　　　L. E. TOPHAM　　　　2,336,049
METHOD OF MAKING LASTS
Filed July 18, 1942　　　10 Sheets-Sheet 6

INVENTOR
Laurence E. Topham
By his attorney

Dec. 7, 1943.  L. E. TOPHAM  2,336,049
METHOD OF MAKING LASTS
Filed July 18, 1942   10 Sheets-Sheet 7

INVENTOR
Lawrence E. Topham
By his attorney

Dec. 7, 1943.  L. E. TOPHAM  2,336,049
METHOD OF MAKING LASTS
Filed July 18, 1942   10 Sheets-Sheet 9
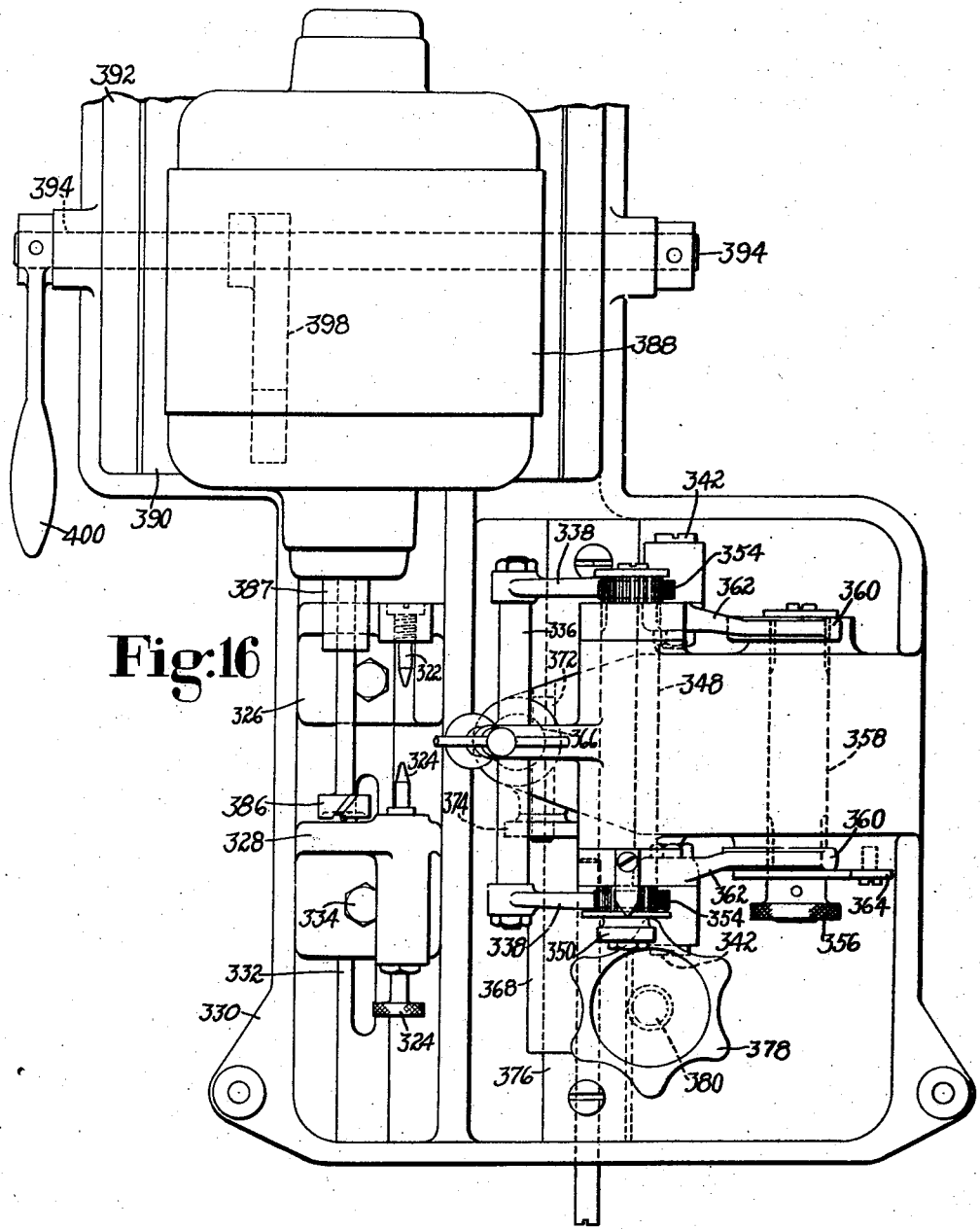
Fig:16
INVENTOR
Lawrence E. Topham
By his attorney

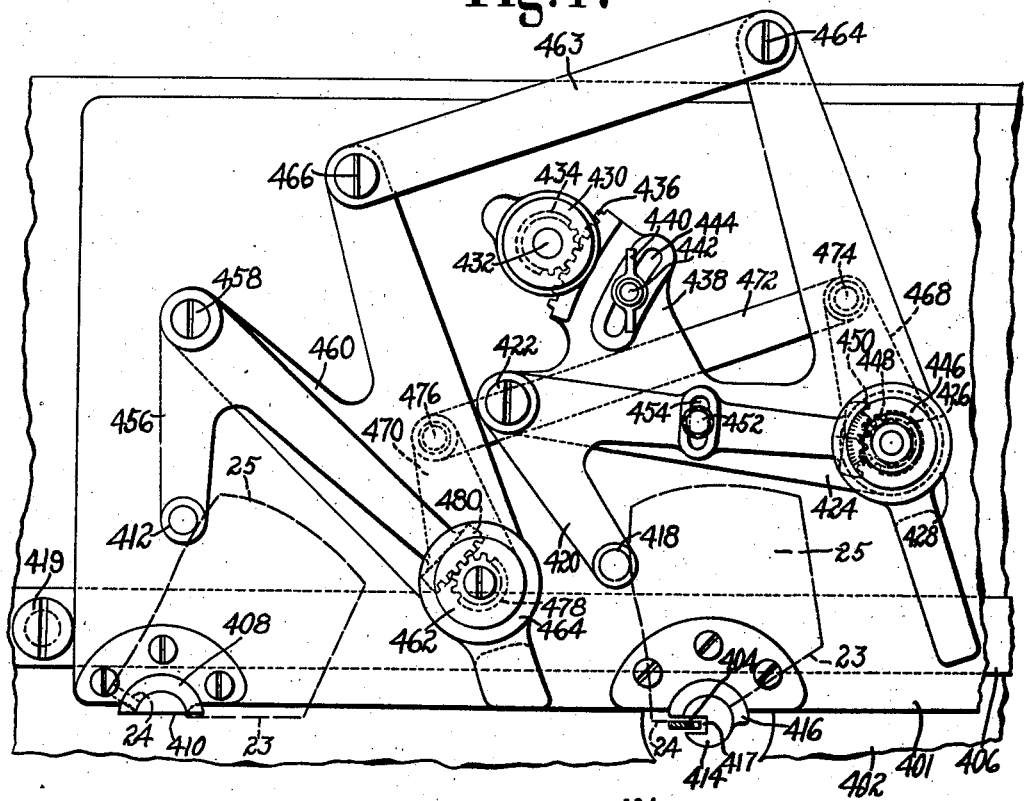
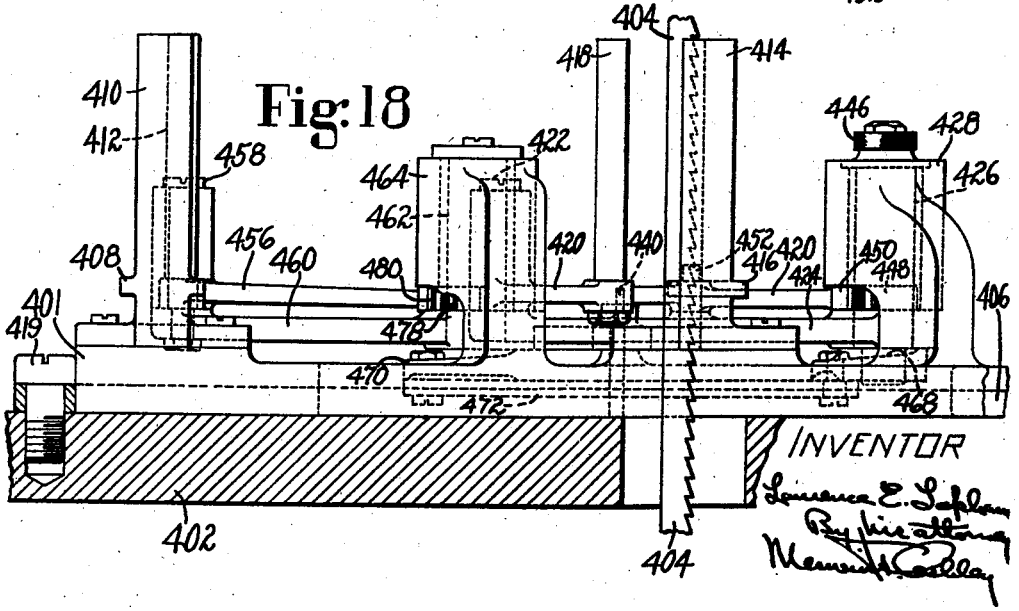

Patented Dec. 7, 1943

2,336,049

UNITED STATES PATENT OFFICE 2,336,049

METHOD OF MAKING LASTS

Laurence E. Topham, Wenham, Mass., assignor to United Shoe Machinery Corporation, Flemington, N. J., a corporation of New Jersey Application July 18, 1942, Serial No. 451,435

5 Claims. (Cl. 12—146)

This invention relates to the manufacture of lasts and is concerned with the production individually of a new last part of one species for an old last part of the other species in such a manner as to insure perfect continuity between the shoe-engaging surfaces of the last parts when assembled and that the renewed last will be of the exact size and form desired.

Because the forepart of a last is subject to change in style and wear to a much greater extent than the heel part it has long been customary to discard lasts before the end of the useful life of their heel parts has been reached. This practice results in the waste of the residual useful life of heel parts which often represents a substantial part of the value of the whole last and hence a large sum, considering the great number of lasts in use.

Various attempts have been made, with the above conditions in view, to renew old lasts by returning down or replacing an excessively worn portion of the forepart and in other cases by providing a new forepart. However, to the best of applicant's knowledge no procedure has been developed prior to the present invention which recognizes and deals adequately with all of the requisites for insuring continuity between the surfaces of the old and new or renewed parts of the last when they are assembled, and that the renewed last as a whole will be of the required size and form.

It has been understood that to meet the above objectives identical turning axes must be established in the model, block, and last part for which a new last part is to be turned from the block, and that the model and block must be mounted with their axes in coincidence with that of the lathe when the block is turned; but other equally important relations involving the relative lengths of the model and old last part and the relative position of the model and block lengthwise of the turning axis of the lathe appear to have been overlooked or ignored heretofore. Unless provision is made for establishing these latter relations the accurate fitting of the old and new last parts and the required length of the complete last are obtained fortuitously, if at all.

The relations referred to above are that the effective length of the model must exactly complement that of the old last part, or the portion of the model which exactly complements the length of the old last part must be determined, and that the block and model must be mounted in the lathe so that the joint surface of the block and the corresponding predetermined section of the model are in the same relative position lengthwise of the turning axis with regard to the model follower and cutter respectively, irrespective of relative grading movement between the follower and cutter. That is, the cutter must operate upon the block at the edge of its joint surface at the same time when the follower engages the corresponding section of the model.

The prior art includes several patents which deal with the turning of an individual last part from a block having a joint surface already formed thereon; but in most of these patents, of which the Brown Patent No. 906,378 is typical, the making of the model in the first instance with regard to the fitting of the new last part to the old one has been disregarded altogether, notwithstanding the fact that the model-making aspect of the procedure requires treatment as exacting as that involved in the turning of a reproduction of the model.

That is, there is no evidence in this patent that any attention has been paid to the relation between the model and the old last part to which a new last part is to be fitted; and although the model may itself be accurately reproduced, there is no insurance that a reproduction of the model will properly fit the old last part.

In other cases, the consideration of the above problem is inadequate, and insufficient provision has been made for relatively positioning the model and work in the required relation lengthwise of the turning axis of the lathe. For example, in the practice of the method disclosed in the Fitzpatrick Patent No. 1,969,739, it is assumed that because the heel ends of the model and the old last part are in abutting relation to their respective face plates or dogs that the model, old last part, and the block are properly positioned lengthwise of the lathe. The critical relation is that between the joint surface of the block and the corresponding section of the model. This relation in the Fitzpatrick method referred to above, is variable and unpredictable because it is affected by any variation in the shape of the end of the last or model owing to hand finishing, different amounts of crushing of the ends of the model and last which are certain to occur because of variations in the strength of different pieces of wood and the use of different dogging pressures and, also, tht variation in the positioning of the joint surfaces of the model and last arising from the fact that the joint forming operation, as it is carried out in actual practice, is relatively inaccurate. These factors together, or even individually, make it extremely unlikely that the accuracy necessary for producing the desired results would ever exist.

In view of the foregoing, the object of the present invention is to provide an improved method of last making in the practice of which all relations between the model, the old last part to be fitted with a new one of the other species, the new block, and the lathe, which are essential for the production of a new last part of proper size and form, will be established and maintained. For the sake of convenience, the invention will be described herein with reference to the making of a new forepart to fit an old heel part, but it is to be understood that the invention comprehends and is applicable to the making of a new heel part to fit an old forepart or even the making of matching fore and heel parts individually.

A requisite for the practice of the present method is that identical relations must be established in the model, the last block, and the heel part to which a new forepart is to be fitted between (1) the joint section or surface as the case may be, and (2) the model, block, or heel part, as a whole. Each of the relations referred to involves both the angular relation of the joint section or surface to the turning axes, and also the position lengthwise of the model, block, or heel part, of its respective joint section or surface.

In accordance with the present method, in one aspect, joint sections are so established in the model and block that they have the same relation to their respective turning axes.

Furthermore, and in accordance with the present method in another aspect, the establishing of the above-mentioned joint section and surface in the model and block lengthwise thereof is effected with regard to the position of the joint surface of the heel part lengthwise of it. That is, in the practice of the present method, the joint section and joint surface of the model and block respectively are located longitudinally thereof in positions corresponding exactly to the position of the heel part joint surface longitudinally of the heel part; and corresponding points which are indicative of the joint section and surface of the model and block, respectively, are in the same relative position lengthwise of the lathe in which they are mounted when the turning operation is performed.

Thus, with the concurrence of both of the conditions referred to above, the size of a last comprising a new forepart made by the practice of this method, and an old heel part, must be the same as that of the model when no grading is done, or different from the model by a predetermined and proper amount when grading is done.

Similarly, since the angular relation between the joint surfaces of both the fore and heel parts and their common turning axis is the same, the angular relation between the two last parts when assembled is correct and the same as in the model.

Perfect continuity of the lateral and bottom surfaces of the fore and heel parts in the vicinity of the joint is also insured by the fact that, in the practice of the present method, provision is made for turning the forepart at its joint section with exactly the same peripheral form as that of the model at its joint section. To this end, and in accordance with the present invention in another aspect, the model and block are mounted in the lathe so that the joint section of the model and the joint section of the block are not only in the same relative position lengthwise of the lathe but also are located at particular positions, herein called "focus" positions, lengthwise of the illustrated lathe at which the cutter and model are situated simultaneously at one stage of their travel, regardless of whether the lathe is set to grade up, down, or to copy.

Accordingly, whether grading is done or not, the peripheral form of a new forepart at its joint surface will be turned strictly with reference to the joint section of the model. Since this section of the model also corresponds strictly to the joint section of the heel part, it is evident that the peripheral contours of the heel part and new forepart, which are contiguous to each other, must match perfectly when the last parts are assembled on each other.

The above and other features of the invention, including various novel details of construction and combinations of parts, will now be more particularly described by reference to the accompanying drawings and pointed out in the claims.

In the drawings,

Fig. 1 is a perspective view of a last lathe with parts broken away and illustrating the operation of turning in accordance with the present method a reversed copy of only the forepart of a last which copy is to be used as a model;

Fig. 2 is a fragmentary perspective view of a last lathe illustrating the operation of turning a separate last forepart in accordance with the present method and using the forepart model produced by the operation illustrated in Fig. 1;

Fig. 3 is a perspective view of a jig or device for establishing coincident turning axes and common joint sections in the model and work;

Fig. 4 is a perspective view of a last which is to be used as a model for the production of a separate forepart model adapted for use in turning a separate forepart which fits the heel part of another last like the complete model;

Fig. 5 is a perspective view of the last of Fig. 4 with the gap in its cone filled and mounted on a dog adapted for holding the last as a model in the left-hand side of the lathe of Fig. 1;

Fig. 6 is a perspective view of a heel part to be fitted with a new forepart, the joint surface of the heel part having been reformed in accordance with the present invention;

Fig. 7 is a perspective view of a forepart model produced by the operation illustrated in Fig. 1 and a spacer which connects the model and the face plate of the lathe, the spacer and model being shown in exploded relation;

Fig. 11 is a sectional side elevation of the device shown in Fig. 10, the section being taken along the line XI—XI in the latter figure;

Fig. 16 is a plan view of the machine illustrated in Fig. 15;

Fig. 17 is a plan view of a jig used in connection with a band saw for forming new shoulders on a heel part above and below the knuckle recess;

Fig. 18 is a front elevation of the jig illustrated in Fig. 17;

Figure 8:
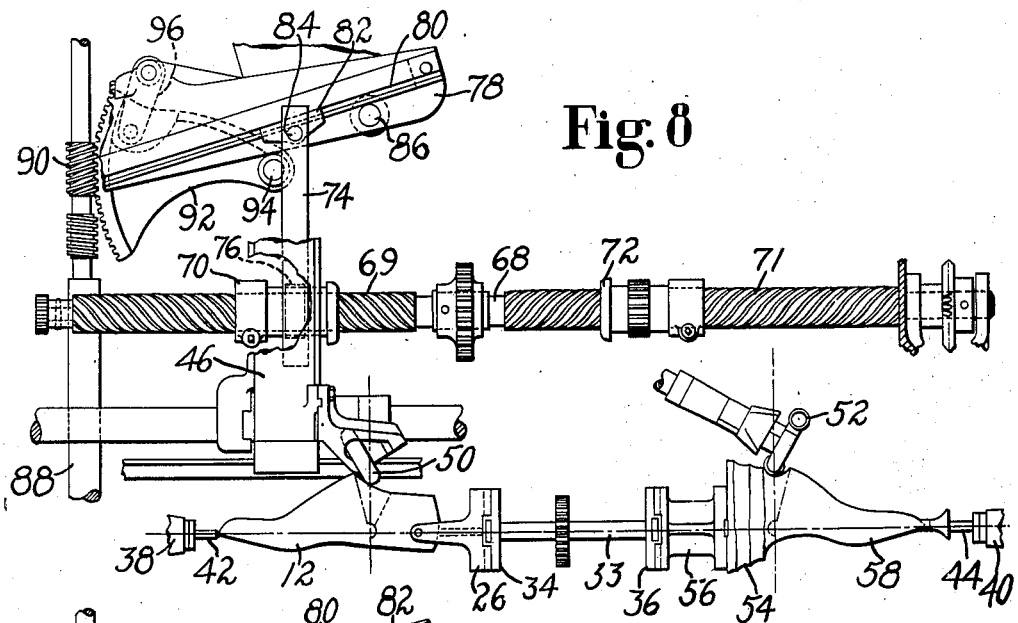
Fig. 8 is a diagrammatical view illustrating the length grading mechanism of the illustrated lathe, and the relation lengthwise of the lathe between the model wheel, model, cutter, and the work which exists during the copying operation illustrated in Fig. 1.

Fig. 19 is a diagrammatical view illustrating the relations between (1) the joint surfaces of a last used as the original model, (2) the joint surfaces of a renewed last similar to the model and, (3) the turning axes of the model and the parts of the renewed last, as established by the use of the device of Fig. 3; and Fig. 20 is a front elevation of a partially turned new forepart corresponding to the forepart having the joint surface indicated by dotted lines in Fig. 19.

Before proceeding to a detailed description of the construction and use of machines and apparatus illustrated in the drawings, a general outline of the present method and some of the illustrated apparatus will be stated below.

It is assumed that the heel parts of a group of lasts are to be provided with new foreparts, the old foreparts being either excessively worn or obsolete because of their style. One of these lasts 10 (Fig. 4) preferably a last the joint of which is in good condition, is selected to be used as a model. The style of the new forepart and the condition of the old forepart permitting, the latter is now shaped by hand into the form which the new forepart is to have. If it is not thus possible to utilize the old forepart of the model last, new wood is pieced onto the old forepart which is then shaped as before, or if this expedient is impracticable, an entirely new forepart block is fitted to the old heel part, the new forepart being shaped out of the block continuous with the surfaces of the heel part and into the required form and size.

If there is the usual V-notch between the fore and heel parts of the last after the above procedure has been carried out, it is filled in with a block of wood or other suitable material, the sides of which are shaped continuously with the lateral surfaces of the fore and heel parts and the top portion of which is shaped in a smooth curve connecting the tops of the fore and heel parts. Thus, a complete and rigid model 12 (Fig. 5) is made from the old last 10.

The foreparts of the remaining lasts of the group referred to are now disassembled from the heel parts, on which new joint surfaces are formed, as illustrated in Fig. 6, for a dual purpose as will now be explained. It is impracticable to utilize the old joint surfaces on the heel parts, partly because of their worn or damaged condition but more especially for the reason that the accurate and economical fitting of new foreparts to old heel parts on a high production basis requires a more accurate and consistent relation between the joint surface and the heel part or last as a whole than exists in a group of ordinary lasts.

The joint in a last is commonly made by a band sawing a solid last after it has been turned. Ordinarily, the joint of the last comprises a knuckle 14 (Fig. 4) on the heel part, a complementary knuckle recess 16 in the forepart, and a pair of shoulders 18, 20 one on each last part, which are normally in abutting relation and serve to maintain the proper angular relation between the last parts in a vertical plane. The position of the knuckle and shoulders lengthwise of the last and the angular relation of the knuckle and shoulders to the last may all vary substantially in different lasts because the band sawing operation cannot be carried out accurately in practice, owing to the tendency of the band saw to creep, particularly when a curved cut of small radius is made.

Because the knuckles and shoulders on the old heel parts are irregularly shaped and positioned thereon, as pointed out above, foreparts having a joint surface of predetermined form which is the same in all cases would not fit all of the old heel parts. Usually, moreover, the old joint surfaces could not be renewed without making the knuckle too small, or making the heel part too short. Accordingly, a new knuckle recess 22 (Fig. 6), instead of a knuckle, and shoulders 23, 24 are formed on each renewed heel part 25, in accordance with the present method, far enough back from the original knuckle and shoulder to insure that the new joint surface will be formed entirely in solid wood. As will more fully appear below, the new joint surface on each old heel part is formed at a predetermined position lengthwise thereof and in a predetermined angular relation to the heel part as a whole. In heel parts of different sizes the joint surfaces will be formed at different distances from their heel ends, these distances being in conformity to a definite ratio between the length of the heel part and the total length of the last. That is, in a series of heel parts of the same style but of different sizes, the joint surfaces will all be located at the same relative position lengthwise thereof. Applicant's method of utilizing an apparatus for thus forming new joint surfaces on heel parts will be described later in detail.

The above-mentioned model 12 is now mounted on a chuck 26 (Fig. 5) and is placed in the left-hand side of a lathe 27, as illustrated in Fig. 1. The chuck 26 comprises arms 28 which support a rod 29 perpendicular to the axis of the chuck and adapted to be received in a hole drilled transversely through the heel part of the model. The chuck also carries a center 30 adapted to engage a center mark in the heel end of the model and thereby position the latter widthwise and also angularly with respect to the axis of the chuck. The drilling and centering of the model is a critical operation which also will be described in detail later.

The lathe illustrated herein is of the type disclosed in United States Letters Patent No. 2,072,228, granted on March 2, 1937 on an application of L. E. Topham et al. This lathe has a swing frame comprising a square, rotatable shaft 31 on which is fixed a head stock 32 having rotatably mounted therein a spindle 33 (Figs. 8 and 9) carrying face plates 34, 36 at its opposite ends. Tail stocks 38, 40 (Figs. 1 and 2) are mounted on the shaft 31 for adjustment longitudinally thereof and are provided with rotatable centers 42, 44, respectively. The lathe also comprises carriages 46, 48 on which are rotatably mounted a model wheel 50 and a cutter 52, respectively. The carriages 46 and 48 are arranged to move in opposite directions lengthwise of the lathe at equal or different rates depending upon whether the model is to be copied exactly or to be reproduced in some other size. Except as to one feature of this lathe, which will be described below, further description of the lathe is unnecessary for an understanding of the present invention; but reference may be made to the above mentioned patent for a detailed description of the lathe.

With the chuck 26, carrying the primary model 12, mounted on the face plate 34, and a forepart block 54 held by a spacer 56 mounted on the face plate 36, a reversed copy 58 of the forepart portion of the model 12 is made from the block 54, this forepart model 58 being a "right" if the primary model 12 is a "left." The spacer 56 is employed in order to avoid the use of an excessively long forepart model block 54, and the length of the spacer is related to the length of the chuck 26, as will be explained later.

The forepart model 58 is next placed on the faceplate 34 without the spacer 56 (Figs. 2 and 9) and a forepart block 60 is mounted in the right-hand side of the lathe on a chuck 62 adapted to be attached to the face plate 36. The block 60, before being mounted in the lathe, will have been provided with a joint surface 64 having a hinge knuckle to be seated in the recess 22 of the heel part 25 (Fig. 6) when the latter and the new forepart 66 are eventually assembled.

Thus, the preparation of the block 60 involves forming the joint surface in such a position with respect to the block as a whole that when the block is positioned in the lathe by engagement with the chuck 62 the forepart turned from the block will not "run out" of it.

The chuck 62 is of a particular length, as will be explained later, and has a surface which is a counterpart of the joint surface on the block, whereby the knuckle of the latter will not only be positively driven but will be located exactly on the turning axis of the model 58 and the lathe.

The lathe is now operated to turn the new forepart 66 from the block 60, which forepart will be a "right" like the original model 12 and will fit accurately that heel part (Fig. 6) for which the new forepart is intended.

Providing the proper "fit" of the new separately turned forepart 66 and the old heel part 25 requires making the forepart of such size and form that its lateral and bottom surfaces are continuous with those of the heel part, making the joint surfaces on both last parts in the same relation to the last as a whole to insure the proper angular relation between the last parts, and making the forepart of such length that, when it is combined with the heel part, the length of the complete last is correct.

These requirements cannot be met without the use of exacting control as to the relation between the model and the block in all the turning operations referred to above. That is, the model and block for each turning operation must be mounted in a definite position lengthwise of the lathe in order that the length of the new forepart will be correct; and the same angular relation, in all respects, of the turning axis to the joint surface must be established between the model and work in both turning operations. The present invention, in one aspect, is especially concerned with this positioning of the models and blocks in the lathe, which has been inadequately dealt with heretofore. The description of the invention will best be understood if all of the necessary relations between the heel part 25, the models 12 and 58, the blocks 54 and 60, and the lathe 27, are stated at the outset.

One requisite for insuring an accurate fit of the new forepart and the old heel part is that the peripheral surface of the forepart at the joint surface must be formed at the same time that the model wheel engages the corresponding section of the model. Regardless of the type of lathe employed, if these conditions do not exist there is no insurance that the new forepart (particularly one which has been graded up or down from the model) and old heel part will fit together at the joint without a jog between their lateral and bottom surfaces. Moreover, unless the forepart block is located lengthwise of the lathe so that its joint surface and the corresponding section of the model are in the same relative position lengthwise of the lathe, the length of the new forepart will be incorrect. A characteristic of the illustrated last lathe 27 which facilitates establishing the conditions in question is that, regardless of the setting of this lathe as to the length grade, the cutter 52 and model wheel 50 occupy the same relative position lengthwise of the lathe at the same time at one stage of their travel lengthwise of the lathe. These positions of the model wheel and cutter are indicated by the dot and dash lines 98 and 100, respectively, in Fig. 9 and will be referred to hereinafter as their "focus" positions.

Figure 9:
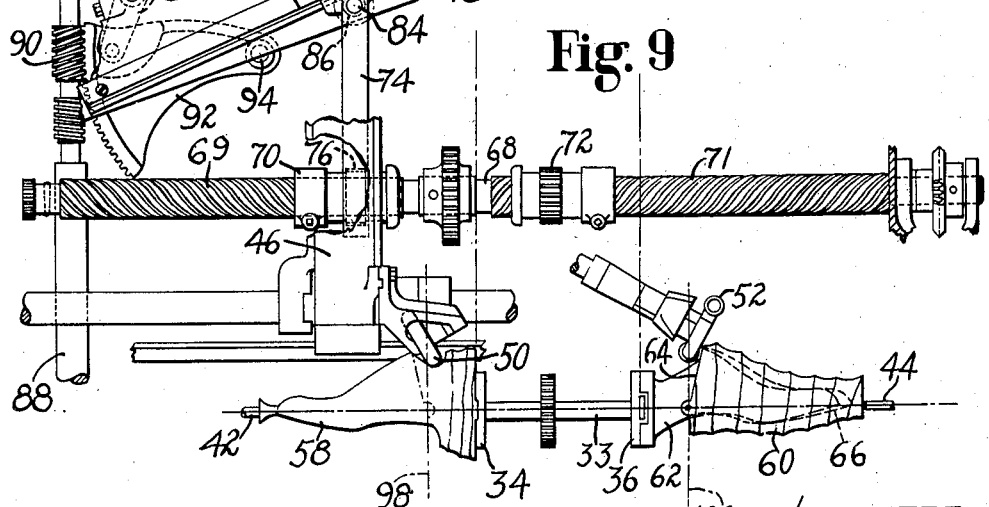
Fig. 9 is a diagrammatical view similar to Fig. 8 but with the grading mechanism set to grade up from the model, and illustrating the relation between the model wheel and cutter and their respective focus positions.
Figure 10:
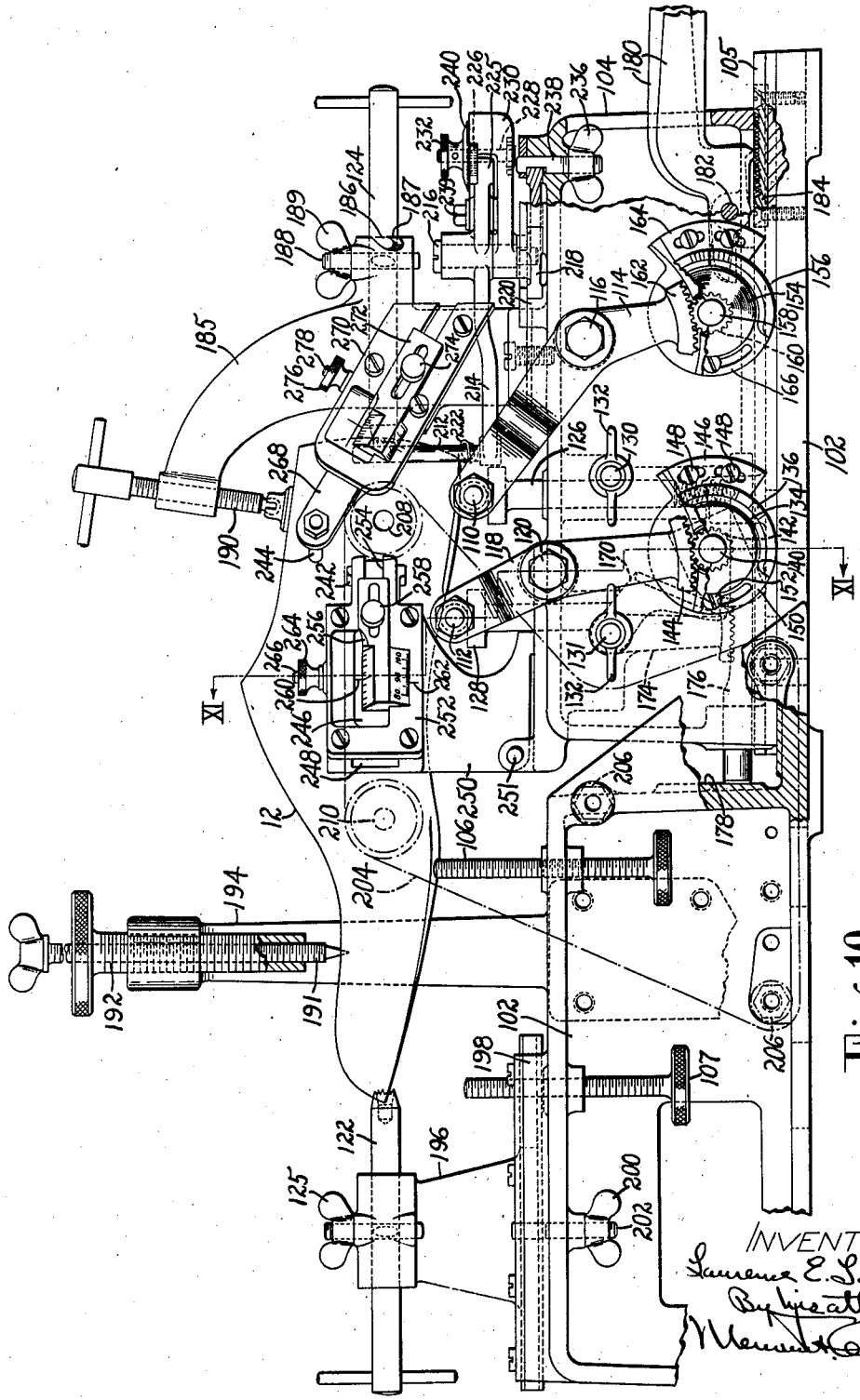
Fig. 10 is a front elevation of the device illustrated in Fig. 3.
Figure 12:
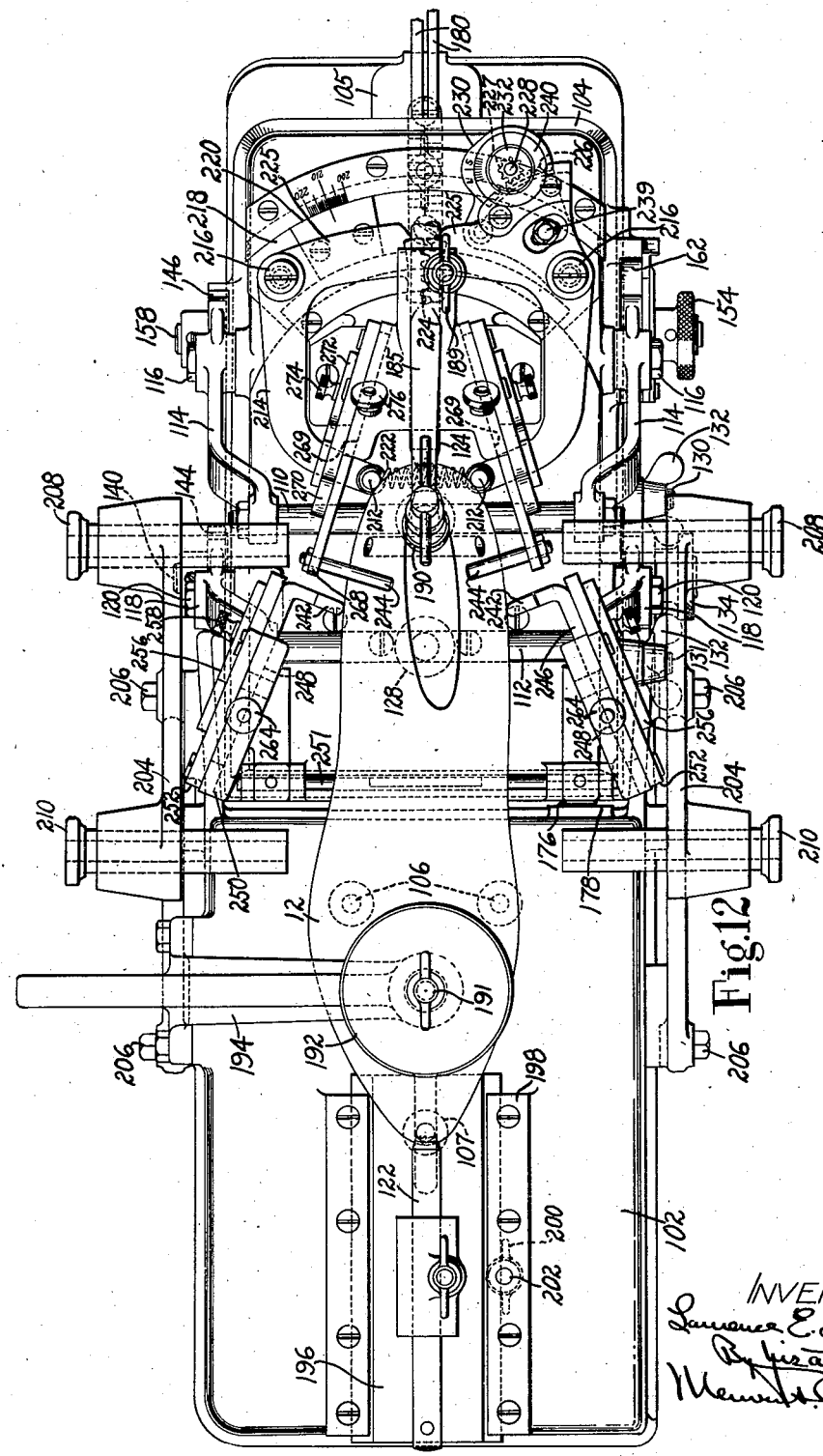
Fig. 12 is a plan view of the device shown in Fig. 3.

This feature of the illustrated lathe will be better understood from a description of certain parts of the lathe which are illustrated diagrammatically in Figs. 8 and 9.

The model wheel 50, the cutter 52, and their respective carriages 46, 48 are moved in opposite directions by mechanism comprising a rotating shaft 68 the left-hand portion of which has a right-hand multiple thread 69 carrying a nut 70 which is rotatably mounted in the carriage 46 but is incapable of moving lengthwise thereof. The right-hand portion of the shaft 68 has a left-hand multiple thread 71 of lesser pitch than that of the thread 69 and carries a nut 72 which is fixedly mounted in the cutter carriage 48. The lathe includes connections between the shaft 68 and the shaft 33 by which these shafts are driven in timed relation, and for every revolution of the shaft 68 the cutter 52 is progressively moved lengthwise of the machine a distance equal to the pitch of the thread 71.

The model 12 is copied, graded up, or down, depending upon the rate at which the nut 70 is rotated relatively to the shaft 68 in the direction of the rotation of the shaft 68, as the carriage 46 moves lengthwise of the lathe. That is, if the nut 70 is rotated so as to compensate for the difference in pitch of the threads 69 and 71 the model is exactly copied; but if the nut is rotated slower or faster the work is graded down or up respectively from the model. The mechanism in the illustrated lathe for thus controlling the nut 70 comprises a rack bar 74 mounted in the carriage 46 to slide perpendicular to the direction of movement of the carriage. The rack bar 74 meshes with a pinion 76 formed at the center of the nut 70 and is actuated by a member 78 having a slideway 80 in which a block 82 pivoted at 84 to the bar 74 is adapted to slide. The member 78 is pivoted to the frame of the lathe at 86, the pivot points 84 and 86 being so arranged as to be brought in register (Fig. 9) at one stage of the travel of the carriage 46 lengthwise of the lathe. If the member 78 is set in its neutral position as illustrated in Fig. 8, the nut 70 is rotated at such a rate as to compensate for the difference in pitch of the threads 69 and 71, and under these circumstances the model wheel 50 and cutter 52 are moved oppositely to each other at equal rates whereby the reproduction of the model and the model itself are the same in length. However, length grading is effected by setting the member 78 at either side of its neutral position whereby a rotative movement either greater or less than that which exactly compensates for the difference in pitch between the threads 69 and 71 is imparted to the nut 70 by the bar 74 as the block 82 follows the slideway 80. The member 78 is thus adjusted by turning a shaft 88 having a worm 90 arranged to mesh with a segmental gear 92 pivoted to the frame at 94. A link 96 is connected at one end to the gear 92 and at its other end to the member 78. It will now be understood that, when the member 78 is in its position as illustrated in Fig. 9, movement of the carriage 46 to the left causes the nut 70 to be rotated relatively to the shaft 68 in the same direction in which the latter is rotated, whereby the normal feed movement of the carriage 46 is diminished. Accordingly, the length of the last part 66, which is turned, exceeds that of the model 58 the distance which the nut 70 moves axially of the shaft 68, owing to its own rotation with respect to the shaft, while the model wheel 50 traverses the length of the model. However, regardless of whether the member 78 is set for grading up, down, or for copying, it will be observed, with reference to Fig. 9, that when the pivots 84 and 86 are in register, the bar 74, the nut 70 and the shaft 68 will always be in the same relation. Therefore, regardless of the setting of the member 78, the cutter 52 and model wheel 50 will always occupy the same position in the lathe lengthwise thereof when the pivots 84 and 86 are in register. These positions of the model wheel 50 and cutter 52, indicated by the dot and dash lines 98 and 100, respectively, in Fig. 9, are their "focus positions" mentioned above.

Considering now the question of insuring the proper longitudinal relation between the models and the forepart blocks in the lathe, the forepart block dog 62 (Fig. 9) is of such length that its block engaging surface (and hence the joint section of the block 60 when mounted on the dog) is located at the focus position 100 of the cutter 52. In this connection, it is to be understood that the joint section or surface of the models 12 and 58 and block 60 will be considered, throughout the application, as defined by a plane perpendicular to the turning axis and passing through the center of the knuckle or knuckle recess, and that the term "joint section" refers to the peripheral contours of the last parts and model at the above mentioned plane. In order that the joint section of the new forepart 66 will be formed while the model wheel traces the corresponding section of the model, the model 58 is so made that when it is installed on the face plate 34, its joint section is at the focus position 98 of the model wheel. This arrangement of the model 58 and block 60 insures that when a proper new forepart model is provided, a new forepart 66 of the proper peripheral form at the joint section will be obtained whether the model is being copied or graded.

Referring to Fig. 8, this critical forming and positioning of the model 58 results from maintaining the original model 12 and the forepart block 54, from which the forepart model 58 is turned, with the joint section of the forepart block and the joint section of the model 12 in the same angular relation to the turning axis and in a predetermined relation to each other lengthwise of the turning axis.

It is well understood by those skilled in this art that upon mounting a model in a last lathe at one side of it, the position in space on the other side of the lathe of a reproduction of the model is established, and that if the reproduction is a copy, corresponding points on the model and copy will be equidistant from a common longitudinal center of the lathe. In the illustrated lathe, the distance of the focus position of the model wheel 50 from the face plate 34, is a predetermined distance, namely 2½ inches and the length of the spacer 56 is equal to the length of the chuck 26 from its base to the center of the rod 29. Therefore, the proper mounting of the original model 12 in the chuck 26 requires that the joint section of the model corresponding to the joint surface of the heel part 25 (Fig. 6) to be fitted with a new forepart must be located 2½ inches beyond the center of the rod. It is to be understood that there is no necessity for having the chuck 26 and the spacer 56 the same length, since all essential conditions relating to the proper longitudinal positioning of the models and forepart blocks in the lathe will be met if the model 12 is so mounted that the sum of the distance of its joint section from the rod 29 and the length of the chuck 26 is equal to the sum of the lengths of the spacer and forepart block dog 62. The latter length is always fixed for any given lathe since it must be equal to the distance of the focus position of the cutter from that face plate associated with the cutter. The application of the last mentioned relation to the present method will become apparent as the description of the invention proceeds.

Another requisite for the proper fitting of a new forepart to a given heel part is that axes must be established in both models, the heel part and the forepart block, these axes having the same angular relation to the joint surface or joint section, as the case may be, in every instance. It is essential, moreover, that these axes as established in the models and forepart block shall also coincide with the turning axis of the lathe when the turning is done.

How all of these relations and conditions are established and maintained in the practice of the present method will more fully appear from the following detailed description of the machines and apparatus illustrated in the drawings.

The model 12 is prepared for mounting in the chuck 26 by having its turning axis established and a hole drilled to receive the rod 29 of the chuck. These operations are performed by the use of a jig (Figs. 3, 10, 11 and 12) having a frame 102 on which is mounted for adjustment lengthwise thereof a heel part positioning unit 104. The latter has a T-slot in its base which receives a slideway 105 fixed to the frame 102. The forepart of the model 12 is supported adjacent to the ball line in the jig by a pair of screws 106, and at the toe end by a screw 107, all of these screws being vertically threaded in the base 102. The heel part of the model 12 rests on a pair of rods 110 and 112. The rod 110 is carried by a pair of bell cranks 114 which are rotatably mounted at opposite sides of the unit 104 on studs 116 fixed to the unit. Similarly, the rod 112 is carried by a pair of bell cranks 118 which are rotatably mounted at opposite sides of the unit 104 on studs 120. The rods 110, 112 are adapted to be adjusted, in connection with the screws 106 and 107, so as to support the model 12 with its bottom in a substantially horizontal plane with its toe end opposite to a centering tool 122 and with the center of its heel end opposite to another centering tool 124. The rods 110 and 112 are positively supported against clamping pressure, which later is to be applied to the top of the heel part of the model, by plungers 126, 128, respectively, which are mounted to slide upwardly in the unit 104 under the influence of springs 129 (Fig. 11) into engagement with the rods. The plungers 126, 128 are adapted to be clamped in the unit by rods 130, 131, respectively, having wedge surfaces which bear against the plungers when wing nuts 132 threaded on the outer ends of the rods are tightened.

Heightwise adjustment of the rod 112 is effected by turning a knob 134 (Figs. 10 and 11) which together with a flange 136 is fastened by a pin 138 to a shaft 140 rotatably mounted in the unit 104. The shaft 140 has gears 142 formed thereon adjacent to each end, these gears being adapted to mesh with segmental gears 144 formed on the lower ends of the bell cranks 118. The flange 136 is provided with a set of graduations based upon the grading system applicable to the type of last being operated upon, and adjacent to the periphery of the flange, an index plate 146 (Fig. 10) is mounted on the unit 104 for limited adjustment about the center of the shaft 140. The plate 146 is secured to the unit 104 by screws 148 which pass through arcuate slots formed in the plate. A second index plate 150 is adjustably mounted on the flange 136 and is fixed thereto by a screw 152 which is threaded into the flange. After the knob 134 has been turned to cause the model 12 to be positioned properly heightwise in the jig, as described above, the index plates 146 and 150 are set in register with the same graduation on the flange 136. The purpose of the plate 150 is to indicate permanently for a given style of last the graduation on the flange opposite to which the index plate 146 was originally set, and by turning the knob 134 so as to bring different graduations on the flange 136 into register with the index plate 146, the rod 112 is set in accordance with different lasts of the same style graded up or down from the model size indicated on the flange 136 by the index plate 150.

Mechanism similar to that described above is provided for adjusting the rod 110 heightwise. This mechanism comprises a knob 154 and a graduated flange 156 which are fixed to a shaft 158 rotatably mounted in the unit 104. The shaft 158 has gears 160 cut thereon adapted to mesh with segmental gears 162 formed on the lower ends of the bell cranks 114. Index plates 164 and 166 are also provided in connection with the flange 156 and are constructed and used like the plates 146 and 150 referred to above.

The unit 104 comprises mechanism actuated by the rotation of the knob 134 and shaft 140, the purpose of which is to position the unit 104 lengthwise of the base 102 (Fig. 10), and later, similarly to position the unit 104 lengthwise of the apparatus (Fig. 13) for operating upon a separate heel part 25 in the unit. This mechanism comprises a cam 168 (Fig. 11) which is fixed to the shaft 140 and is engaged by a follower 170 on one arm of a bell crank 172 which is rotatably mounted on the rod 131. The lower end of the other arm 174 of the bell crank is provided with gear teeth arranged to mesh with a rack bar 176 which is mounted to slide lengthwise of the unit 104 and is arranged to engage a vertical shoulder 178 on the base 102. The cam 168, the bell crank 172 and the bar 176 are so designed that, when an adjustment of the knob 134 has been made to compensate for the difference in height between different lasts, caused by grading, a change will be made in the position of the unit 104 relatively to the base 102 to compensate for the difference in length of the lasts in question. The unit 104 is releasably held in adjusted position on the base 102 by means of pawls 180 which are rotatably mounted on a shaft 182 fixed in the unit 104 and are adapted to engage staggered ratchets 184 fixed to the slideway 105.

Assuming that the screws 106 and rods 110, 112 have been adjusted so as to support the model 12 with opposite points at the edge of the bottom at the same level and with the centers of its toe and heel ends opposite to the centering tools 122 and 124, the model 12 is next carefully positioned lengthwise of the jig by moving it to bring its heel end into engagement with the centering tool 124. This tool is mounted to slide and rotate in a bracket 185 fixed to and extending upwardly from the unit 104. The tool 124 normally is positioned in the bracket 185 with a graduation 186 on the tool in register with a pointer 187 on the bracket, and is adapted to be held in this position by a wedge bolt 188 which bears against the tool when a wing nut 189 threaded in the bolt is tightened. When the tool 124 is thus positioned the model 12, upon being placed in engagement with the tool, will be located lengthwise so that the new joint section will be established at a satisfactory position rearwardly of the old joint surface as described above. The model 12 is next clamped by a heel-part clamp 190 and a forepart clamp 191.

Regardless of the size of the model, its heel end will be positioned at the same point lengthwise of the unit 104. It is unnecessary to adjust the tool 124 lengthwise to compensate for models of different lengths because the unit 104 is positioned as a whole as described above by the rack bar 176 in accordance with the length of the model so as to cause the new joint section of the model to be established properly lengthwise thereof.

The heel part clamp 190 is threaded in the upper end of the bracket 185, and is adapted to engage the top of the cone of the model 12. The forepart clamp 191 consists of a pointed screw threaded in a sleeve 192 which itself is threaded in the upper end of an arm 194 extending upwardly from the base 102. The centering tool 122 is rotatably mounted in a support 196 coaxial with the center 124, and may be clamped to the support by tightening a wing nut 125 which is threaded on a wedge bolt adapted to engage the tool 122. The support 196 is mounted in a guideway 198 on the base 102 for adjustment lengthwise thereof, and may be locked in adjusted position on the base 102 by tightening a wing nut 200 which is threaded on a clamping member 202 adapted to bear against the support 196.

The common axis of the centering tools 122 and 124 corresponds, in the jig, to the turning axis of the lathe, and when these tools are operated to make center marks in the clamped model 12, the axis, about which the model will later be rotated in the lathe, is thus established in the model.

A pair of plates 204 are fastened opposite to each other to the sides of the base 102 by means of bolts 206. At the rear ends of these plates are mounted coaxial drill bushings 208 which are opposite to the mid portion of the heel part of the model 12 when positioned in the jig. The bushings 208 are adapted to receive a drill for boring a hole in the heel part of the model which is to receive the rod 29 of the chuck 26. The plates 204 are also equipped with a second set of drill bushings 210 which, in the illustrated construction, are located at a distance of 5 inches from the bushings 208. The center lines of all of these bushings intersect and are perpendicular to the common axis of the centering tools 122 and 124. The model may also be drilled using the bushings 210 as guides to drill a hole in the forepart of the model for the purpose of chucking the forepart of the model, whereby its heel part may be presented in the lathe to the model wheel in case it is desired to turn a new heel part model from the original model 12.

It has already been pointed out that owing to the construction of the chuck 26 and the spacer 56 the section of the model 12 which is utilized as a joint section is located 2½ inches forwardly of the model from the center of the rod 28. It therefore follows that the section of the model 12 which is located at the mid point 211 between the bushings 208, 210 or 2½ inches forwardly of the axis of the bushings 208 will become the joint section of the model when the latter is mounted in the chuck 26 and installed in the lathe. In view of the foregoing, since it is desired that the new joint surface (as indicated by dotted lines in Fig. 19) of a heel part to be supplied with a new forepart, shall be made from an unmutilated portion of the heel part, it is, therefore, evident that the model 12 must be positioned longitudinally in the jig with the section of the model corresponding to the old joint surface of the heel part (shown in solid lines in Fig. 19) forward of the mid point 211 between the bushings 208 and 210. The bracketed reference characters in Fig. 19 refer to parts of a renewed last which is superimposed on the original model 12. The other reference characters refer to parts of the model 12.

Once the model 12 has been positioned in this way in the jig, it is clamped and drilled as described above. This drilling operation, as explained above, establishes the section of the model with reference to which the joint section of the new forepart is determined and, accordingly, the corresponding section of the old heel part where its new joint surface must be formed in order that the over all length of the renewed last shall be correct. It is immaterial where this section occurs in the model 12 since any addition to the length of the new forepart as compared to that of the old one is exactly offset by an equal shortening of the old heel part when its new joint surface is formed.

In the practice of the present method old heel parts are placed in the unit 104 in the same position as that occupied by the heel part of the model 12 and the unit 104 is mounted bodily on other apparatus presently to be described, by the use of which a new heel part joint surface will be formed on each heel part in the same relation to the heel part as a whole as that between the joint section of the model 12, as established in the jig, and the heel part of the model as a whole.

Before the model 12 is removed from the jig, positioning members adapted to engage the sides of the model are brought into engagement with it, these members being adapted later to position a separate heel part in the unit 104 in the same way in all respects in which the heel part of the model 12 is positioned therein.

These members comprise a pair of vertically disposed pins 212 (Figs. 10 and 12) adapted to be brought into engagement with the model near the heel end and later to position the separate heel parts lengthwise and widthwise of the unit 104. The pins 212 are fixed to bell crank levers 214 which are rotatably mounted on studs 216 fixed to a base 218 arranged to slide transversely of the unit 104 in an arcuate guideway 220. The pins 212 are connected by a tension spring 222 which urges the pins toward each other, the movement of the pins always being equal and opposite because of the provision of meshing segmental gears 224 (Fig. 12) formed on arms 225 of the levers 214. On one of the arms 225 are cut gear teeth 226 arranged to mesh with a pinion 227 which is fixed to a shaft 228, the shaft being rotatably mounted in a member 230 carried by the base 218. By turning a knob 232 which is fixed to the shaft 228, the levers 214 are moved simultaneously so as to bring the pins 212 into engagement with the model. If the base 218 is in such a position that only one of the pins 212 engages the model, the base 218 is then adjusted in the guideway 220 and the knob 232 is readjusted until both pins 212 engage the model. The base 218 is then locked in adjusted position by tightening a wing nut 236 which is threaded on a rod 238 having a slot adapted to receive the rear edge of the base 218. The arms 225 may be locked relatively to the base 218 by tightening a screw 239 which extends through a slot in one arm and is threaded into the member 230.

A flange 240 is fixed to the base of the knob 232 and is provided with graduations which indicate settings of the knob 232 corresponding to settings of the knobs 134 and 154. Thus, once the position of the base 218 on which the pins 212 are mounted and the pins themselves have been properly positioned as described above, with reference to the model, the pins 212 can be readjusted by resetting the knob 232 as indicated by its graduations to position a heel part of any size lengthwise of the unit 104 without the use of the centering tool 124. It will now be understood that, although the centering tool 124 is utilized to position the model 12 lengthwise of the unit 104, the pins 212 only, under the control of the knob 232, are later used to effect a similar positioning of separate heel parts in the unit 104.

Other members, in addition to the pins 212, for positioning separate heel parts in the unit 104, comprise a pair of fingers 242 adapted to engage opposite sides of the heel part near the mid portion thereof, and a second pair of fingers 244 adapted to engage opposite sides of the cone of the heel part near the top. The fingers 242 are fixed on slides 246 adapted to be adjusted lengthwise of the model in slideways 248 formed in a U-shaped bracket 250 rotatably mounted on a shaft 251 fixedly supported on the unit 104 at each side thereof. Plates 252 are fixed to the outside of the wings of the bracket 250, thereby to hold the slides 246 in the slideways 248 and have grooves 254 in which scales 256 (Fig. 10) are mounted for adjustment lengthwise of the plates. Each scale is adapted to be locked to its plate 252 in any desired position by a screw 258 which passes through a slot in the scale 256 and is threaded into the plate. The lower edge of the scale 256 is graduated to permit the scale to be set at different definite positions relatively to the plate in accordance with the style of the model; and the upper edge of the scale has graduations representing different sizes of models. Index marks 260 and 262 on the slide 246 and plate 252, respectively, indicate the size setting of the slide 246 and the style setting of the scale 256. Once each finger 242 has been brought into engagement with a side of the model, the slide 246 is locked in the slideway 248 by tightening a thumb nut 264 (Fig. 11) which is threaded on a rod 266, mounted to slide vertically in the bracket 250, and having a groove adapted to receive the slide 246.

It is to be understood that both of the fingers 244 are supported and adjusted in a similar manner, that is, each of the fingers 244 is carried by a slide 268 which is adjustable in a slideway 269 (Fig. 12), in the bracket 185. These slideways are covered by plates 270 on which are adjustably mounted scales 272 like the above-mentioned scales 256. The scales 272 are clamped in adjusted position by means of screws 274 and the slides 268 are held in adjusted position by thumb nuts 276 and rods 278 similar to the nuts 264 and rods 266 mentioned above. As will be noted from Figs. 10 and 12, the directions in which the ends of the fingers 242 and 244 move when they are adjusted, all intersect at the same point on the common axis of the centering tools 122 and 124, this point also being located lengthwise of the unit 104 where the extreme heel end of a model properly positioned in the jig is located. It also will be observed from Fig. 10 that the rods 110, 112 move about the studs 116 and 120 respectively directly toward and away from the same point mentioned above. This arrangement of the members for positioning the heel part of the model and the separate heel parts facilitates the proper positioning of a variety of sizes of models or heel parts by the use of equicrescent graduations on the scales 256 and 272 and also on the flanges 136 and 156. This feature of the illustrated construction is of particular advantage in connection with models and lasts which are geometrically graded.

Assuming now that the model 12 has had turning centers formed therein while it is in the jig and that the fingers 242, 244, the rods 110, 112 and the pins 212 have all been adjusted as described above, the clamps 190 and 191 are unscrewed and the model is removed from the jig and installed in the chuck 26 with the rod 29 of the latter inserted in the hole which has been drilled in the heel part of the model, and with its center 39 disposed in the center mark in the heel end of the model. This assemblage is now placed in the lathe 27 and the primary model 12 is used to turn the final forepart model 58 for use in turning a new last forepart as described above.

Figure 13:
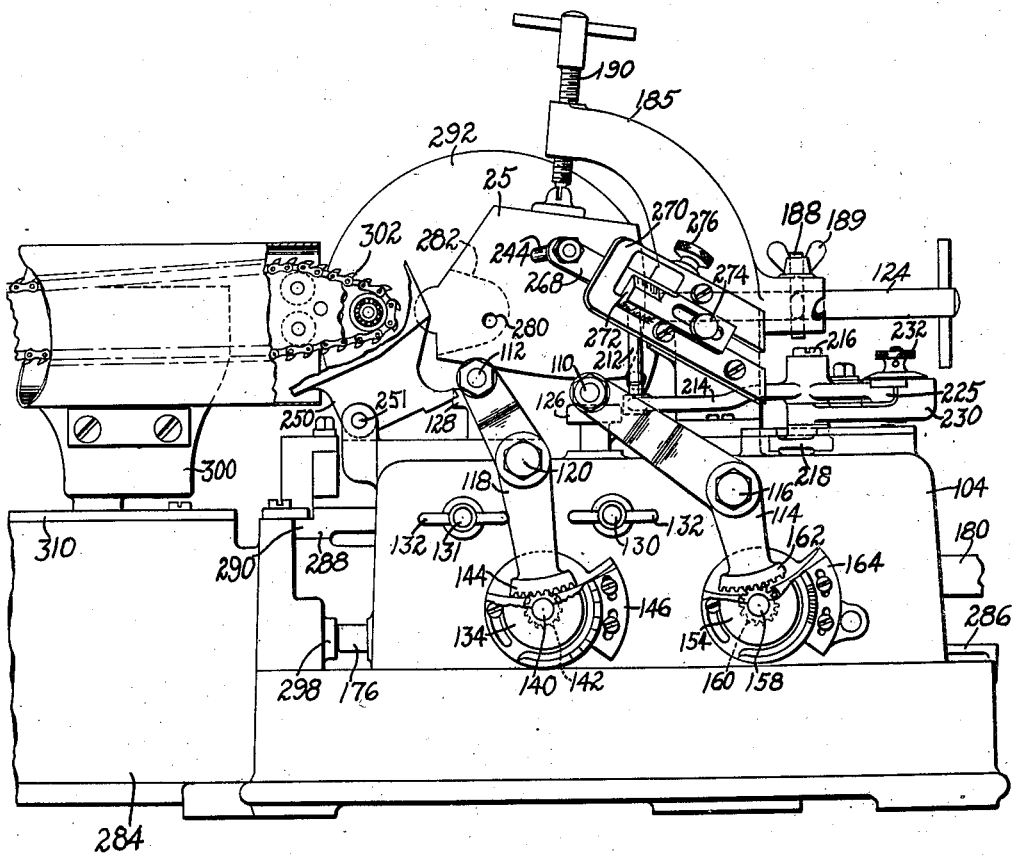
Fig. 13 is a front elevation of a machine for slotting and drilling a heel part while being held by the heel holding unit of the device of Fig. 3.
Figure 14:
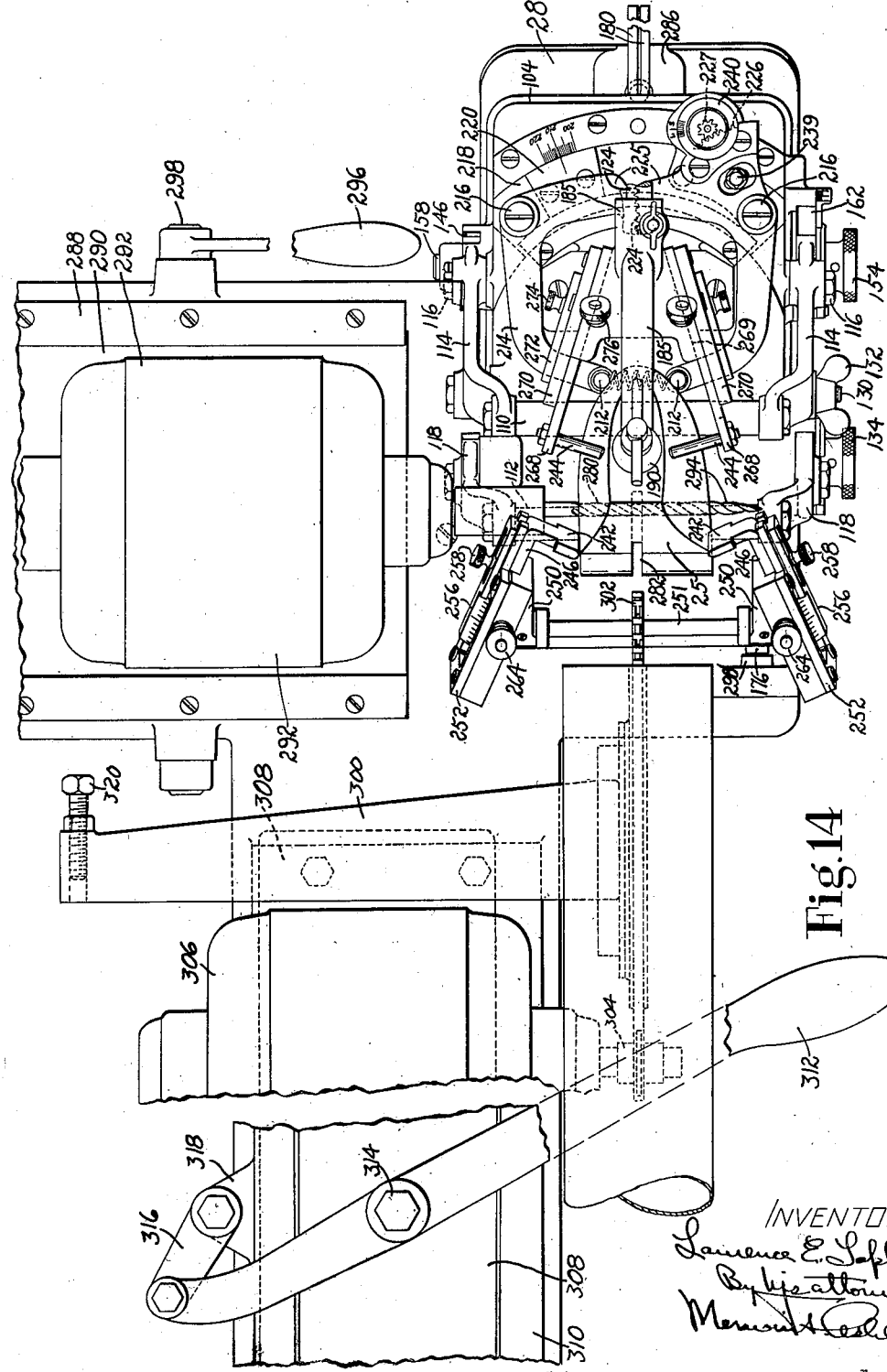
Fig. 14 is a plan view with parts broken away, of the machine illustrated in Fig. 13.

The unit 104 is now used to locate and process a heel part 25, for which it is bodily removed from the base 102 of the jig and is installed on a machine (Figs. 13 and 14) for drilling a hinge pin hole 280 and for sawing a slot 282 in a separate heel part 25. This machine comprises a base 284 having a slideway 286 including a T-shaped member which is received in the similarly shaped slot in the bottom of a unit 104. The base 284 has a cross-feed slideway 288 in which a slide 290 carrying a motor 292 is mounted to slide widthwise of the slideway 286. A drill 294 is mounted on the shaft of the motor coaxial therewith, and is adapted to bore a hinge pin hole 280 in a heel part 25 in the unit 104 when the slide 290 is moved toward the unit. The slide 290 is operated by swinging a lever 296 which is fixed to a shaft 298 rotatably mounted in the base 284 and having a gear (not shown) thereon arranged to mesh with the rack (not shown) attached to the bottom of the slide 290. This operation is performed while the bracket 250 carrying the fingers 242 is retracted, as indicated in Fig. 13, out of the way of the drill 294. The hinge pin hole 280 is drilled at a predetermined distance from the back of the heel part 25 regardless of its size because of the fact that the unit 104 is positioned on the slideway 286 by the engagement of the rack bar 176 with an abutment 299 on the base 284. That is, as the knob 134 is turned to set the rod 112 for a heel part differing in size from that of the model 12, the unit 104 is positioned on the base 284 in accordance with the length of the heel part being operated upon. Thus, the hinge pin hole 280 is drilled at a distance from the back of the heel part in each case which bears a definite relation to the length of the heel part from its newly established joint section to its heel end. The hinge pin hole 280 is also always drilled at a uniform distance below the turning axis of the heel part which is represented in the heel part in the unit 104 by the axis of the centering tool 124. The hinge pin hole 280 also is used, as will be described later, to position the heel part so that the new knuckle recess to be formed on the heel part will be made with its axis parallel to that of the hinge pin hole and, hence, parallel to the bottom of the last with reference to lines extending directly across it.

The saw unit for forming the slot 282 in the heel part comprises a bracket 300 on which is mounted a chain saw 302 of usual construction, the saw being driven by a sprocket 304 mounted on the shaft of a motor 306. The bracket 300 and motor 306 are both mounted on a slide 308 arranged to slide in a slideway 310 so as to cause the saw 302 to move lengthwise of the heel part in the unit 104 in coincidence with the turning axis of the heel part. The slide 308 is operated by a lever 312 which is pivoted at 314 to the slide and is connected by a link 316 to a lug 318 extending rearwardly from the base 284. The depth of the slot 282 cut by the saw 302 is controlled by adjusting a stop screw 320 which is threaded into the rear end of the bracket 300 and is adapted to engage a part of the base 284 adjacent to the slideway 288, whereby the movement of the saw rearwardly of the heel part is limited.

Figure 15:
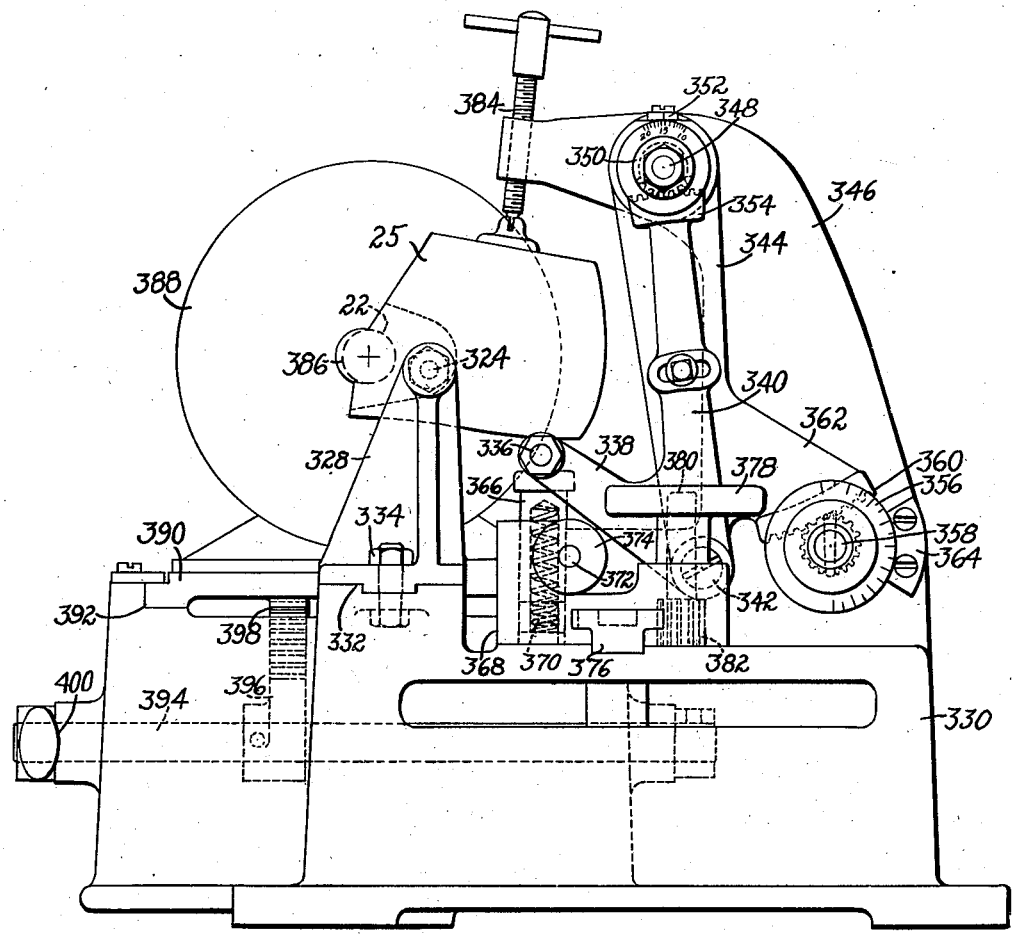
Fig. 15 is a front elevation of a machine for forming a new knuckle recess in a heel part.

After the hinge pin hole 280 and slot 282 have been formed in the heel part, the latter is removed from the machine described above and is put into the machine illustrated in Figs. 15 and 16 which forms the knuckle recess 22 in the heel part. The heel part is mounted in this machine on spurs 322, 324 carried by standards 326, 328, respectively, which are mounted on the base 330 of the machine. The standard 328 is mounted for adjustment toward and away from the standard 326 along a slideway 332 and is clamped to the slideway in adjusted position by a bolt 334. The spur 322 is fixed in the standard 326; but the spur 324 is adapted to slide in the standard 328 away from the other spur, to facilitate removing heel parts from the spurs and replacing others thereon.

The heel part mounted on the spurs 322 and 324 is positioned angularly with respect thereto, and is supported at its rear end, by a rod 336 which is fixed to the ends of the lower arms 338 of a pair of levers 340 which are rotatably mounted on studs 342 carried by a pair of arms 344. The arms 344 are rotatably mounted, at opposite sides of a standard 346 extending upwardly from the base 330, on a shaft 348 which is rotatably mounted in the upper part of the standard. The levers 340 are angularly adjusted relatively to the arms 344 about the studs 342 by turning a knob 350 which is keyed to the shaft 348, the shaft having gear teeth cut thereon which mesh with segmental gears 354 formed on the upper ends of the levers 340. It is to be noted that this adjustment of the levers 340 effects a movement of the rod 336 which corresponds exactly to the movement of the rod 110 (Fig. 10) in the unit 104 when the levers 114 are rotated about the studs 116. It will be observed further that since the hinge pin hole 280 was drilled in predetermined relation to the heel part and to the rods 110 and 112 as well as the other positioning elements of the unit 104, the separate heel part will be positioned in the present machine in the same way that the heel part of the model 12 was positioned in the jig unit 104. The setting of the levers 340 in positions corresponding to those of the levers 114 in the unit 104 is facilitated by a set of graduations on the rim of the knob 350 and an index mark 352 formed on the arm 344. The arms 344 and hence the levers 340 are bodily adjustable about the shaft 348 in order to position the rod 336 in accordance with the style of the last of which the separate heel part is an element. This adjustment is made by turning a knob 356 which is fixed to a shaft 358 rotatably mounted in the standard 346 and having gears formed thereon arranged to mesh with segmental gears 360 cut in the lower edge of wings 362 extending rearwardly from the lower parts of the arms 344. The setting of the knob 356 is indicated by graduations formed on the rim of the knob and an index mark on a plate 364 which is fixed to the standard 346 adjacent to the knob.

Once the heel part has been properly mounted and positioned on the spurs 322, 324 and the rod 336, a support 366 underneath the rod is adjusted lengthwise thereof so as to support the rod directly underneath the point where the rod is engaged by the heel part. The support 366 is mounted for vertical movement in a carriage 368 and is urged into contact with the rod by a spring 370 which is housed in a bore in the support. The support 366 is adapted to be locked in the carriage 368 by a wedge bolt 372 one side of which is recessed to receive the support and which may be tightened against the support by turning a nut 374 threaded on the outer end of the wedge bolt. The carriage 368 is mounted for movement lengthwise of the rod 336 on a slideway 376 and is thus adjusted by turning a knob 378 which is fixed on a shaft 380 rotatably mounted in the carriage 368. A pinion 382 cut on the lower end of the shaft 380 meshes with a rack cut on the side of the slideway 376 adjacent to the pinion. The heel part is rigidly clamped against the spurs 322, 324 and the rod 336 by a clamp screw 384 threaded in the upper end of the bracket 346 and arranged to engage the top of the cone of the heel part.

The knuckle recess 22 is next cut in the heel part by moving a bit 386, or other suitable type of cutter which is fixed to the shaft 387 of a motor 388, crosswise of the heel part and parallel to the axis of the spurs 322, 324. The motor 388 is carried by a slide 390 which is moved in a slideway 392 to impart the above-described feed movement to the cutter 386 by connections comprising a shaft 394 rotatably mounted in the base 330, a gear 396 fixed to the shaft, and a rack 398 arranged to mesh with the gear and fixed to the bottom of the slide 390. The shaft 394 is operated by a hand lever 400 fixed to the left-hand end of the shaft.

It is to be noted with reference to Fig. 15 that the axis of the cutter 386, and hence the axis of the knuckle recess formed by the cutter, is located as far above the axis of the spurs 322, 324 as the latter is below the turning axis of the heel part, indicated by the axis of the centering tool 124 in Fig. 13. Consequently, the axis of the knuckle recess of all heel parts, regardless of their size, will intersect the turning axis of the heel part; and since, as pointed out above, the hinge pin hole 280, by which the heel part is positioned lengthwise when it is mounted on the spurs 322, 324, was formed in the heel part at a predetermined distance from the heel end of the heel part, the effective length of the heel part between the knuckle recess and the heel end will always be predetermined.

The remaining operations on the heel part consist of forming new shoulders below and above the knuckle recess and these operations will now be described with reference to Figs. 17 and 18.

The shoulders 23 and 24 are formed on the heel part in a predetermined position with respect to its knuckle recess 22 and at predetermined angles to its turning axis in a jig having a base 401 mounted for movement on the table 402 of a band saw having a blade 404 arranged to move perpendicular to the table 402. The base 401 is guided in a direction parallel to the blade 404 by a rib 406 extending above the top of the table 402, the rib being slidably received in a groove in the bottom of the base. The heel part is placed in the jig with one side resting against a flange 408 on a rod 410 which is semi-circular in cross section and in adapted to fit the knuckle recess 22 of the heel part. The rod 410 is fixed to the base 401 perpendicular thereto and also in such a position that it is not engaged by the blade 404 in passing the latter. The heel part is positioned angularly with respect to the rod 410 by a support 412 adapted to be engaged by the bottom of the heel part. At this time the jig occupies a position such that the rod 410 is to the right of the blade 404 in Fig. 18.

The operator, while holding the heel part against the flange 408, the rod 410 and support 412, moves the jig bodily to cause the portion of the heel part above the knuckle recess to pass the saw blade 404 whereby the upper shoulder 23 of the heel part is formed. The heel part is next removed from the rod 410 and is placed against a second rod 414 having a flange 416, against which the lower side of the heel part rests, and a recess 417 adapted to receive the saw blade 404 at the end of the travel of the jig. The heel part is positioned angularly with respect to the rod 414 so as to cause the lower shoulder 24 of the heel part to be formed at a right angle to the turning axis of the heel part and in a predetermined relation lengthwise of the heel part to the axis of the knuckle recess, regardless of the size of the heel part. The heel part is thus positioned by being held by the operator with its bottom in engagement with a support 418 which is adapted to be adjusted in the same manner as the rod 336 (Fig. 15) in the machine for forming the knuckle recess described above.

With the heel part now firmly held against the rod 414 the flange 416 and the support 418, the jig is moved bodily to cause the lower shoulder 24 of the heel part to be formed by the saw blade 404. This movement of the jig is limited by a stop 419, which is threaded into the table 402, soon after the upper edge of the lower shoulder of the heel part passes the cutting edge of the blade 404, as indicated in Fig. 17.

The supports 412 and 418 are adjusted and positioned by mechanism constructed on the same principle as that which controls the rod 336 for positioning the heel part when the knuckle recess is formed (Fig. 15). This mechanism comprises a lever 420 on which the support 418 is fixed and which is pivoted at 422 to a member 424. The member 424 is arranged to rotate freely on the lower end of a shaft 426 which is rotatably mounted in a bracket 428 extending upwardly from the base 401. The member 424 is adjusted, in accordance with the style of the heel part being operated upon, by turning a knob 430 which is fixed to a shaft 432 rotatably mounted in the base 401. A pinion 434 formed on the lower part of the shaft 432 is arranged to mesh with a segmental gear 436 formed on an extension 438 of the member 424. The member 424 is clamped to the base 401 in adjusted position by tightening a wing nut 440 which is threaded on a stud 442 fixed to the base 401 and arranged to extend through a slot 444 in the wing 438. Adjustment of the support 418 in accordance with the size of the heel part being operated upon is effected by turning a knob 446 which is fixed to the upper end of the shaft 426. The shaft 426 is provided with a pinion 448 arranged to mesh with a segmental gear 450 formed on the end of the upper arm of the lever 420. The lever 420 is clamped in adjusted position relatively to the member 424 by means of a screw 452 which passes through a slot 454 in the lever 420 and is threaded into the member 424. The knobs 430 and 446 are provided with graduations related to those on the knobs 350 and 356, respectively, in the machine for forming the knuckle recess (Fig. 15) so that regardless of the size of the heel part 25 it may be positioned with its turning axis perpendicular to the direction of movement of the base 401 and, hence, perpendicular to the lower shoulder 24 on the heel part which is formed by the saw blade 404. Whenever the support 418 is adjusted, either by movement of the member 424 relatively to the base 401, or by movement of the lever 420 relatively to the member 424, a similar adjustment is imparted to the support 412 by mechanism which is now to be described. The support 412 is fixed to one arm of a lever 456 which is pivoted at 458 to a member 460 corresponding to the member 424 mentioned above. The member 460 is mounted to rotate freely on the lower end of a shaft 462 which is rotatably mounted in a bracket 464 extending upwardly from the base 401. A link 463 is pivoted at 464 and 466 to the members 424 and 460, respectively, these pivot points being equidistant from the axes of the shafts 426 and 462, respectively. Similarly, the distance between the pivot points 464 and 466 is equal to the distance between the axes of the shafts 426 and 462. Accordingly, any adjustment of the member 424 relatively to the base 401 is accompanied by a like adjustment of the member 460.

To the lower ends of the shafts 426 and 462 are fixed arms 468, 470, respectively, these arms having the same length and being parallel to each other. The arms are connected by a link 472 which is pivoted at 474 to the arm 468 and is pivoted at 476 to the arm 470. A pinion 478 carried by the shaft 462 is arranged to mesh with a segmental gear 480 formed on the lever 456. The pinions 478 and 448 are of the same size. The distance between the pivot point 458 and the axis of the shaft 462 is equal to the distance between the pivot point 422 and the axis of the shaft 426. Accordingly, when the lever 420 is adjusted relatively to the member 424 a like adjustment of the lever 456 is made.

It will now be observed that by the use of the machines and jig illustrated in Figs. 13 to 18, inclusive, an old heel part 25, for which a new forepart is to be provided, has a new joint surface formed on it in a predetermined position lengthwise thereof, and also in a definite angular relation to the axis of the heel part which corresponds to the axis about which the forepart is turned. That is, the hinge pin hole 280 is drilled at a predetermined position lengthwise and heightwise of the heel part. The knuckle recess 22 is formed while the heel part is positioned longitudinally of itself with reference to the hinge pin hole, the heel part at this time also being positioned heightwise so that the axis of the knuckle recess intersects the longitudinal axis of the heel part. The shoulders 23 and 24 are then formed radially with respect to the axis of the knuckle and at predetermined angles to the axis of the heel part, these angles being maintained constant regardless of variations in the size of different heel parts resulting from grading.

Moreover, since the chuck or dog 62 has a block engaging surface parts of which are exactly the same as the knuckle recess 22 and shoulder 24 of the heel part 25, and also have the same angular relation to the turning axis of the lathe as that between the joint surface and turning axis of the heel part 25, by mounting the block 60 on the chuck a turning axis is established in the block which is coincident with the turning axis of the heel part 25 as established by the use of the jig of Fig. 3.

The mounting of the block 60 on the chuck 62 may be facilitated by properly centering its toe end, at the same time when its joint surface is formed, to receive the lathe center 44, as by the use of the machine disclosed in the Topham application referred to above. This centering also may be done by placing the block 60 in the jig of Fig. 3, with the joint surface of the block fitting the joint surface of the heel part 25 mounted in the unit 104, and then operating the tool 122 to form a center mark in the block.

Although the joint sections of the models 12 and 58 are not physically indicated thereon, they are nevertheless definitely established in a predetermined position lengthwise of the models owing to the related construction of the jig 104, the chuck 26, and the spacer 56 and this position of the joint section in the models corresponds exactly to the position of the newly formed joint surface on the heel part. Accordingly, when the new forepart 66 is turned from the block in a lathe in which the model 58 is mounted as described above, the length of the new forepart must exactly complement that of the heel part 25, with the result that the renewed last comprising the new forepart and renewed heel part is either the same as the model or different in size by the desired amount of grading.

Thus, although the last parts are not assembled until after all their forming operations have been completed, their relation to the models and to the operating instrumentalities of the lathe is exactly the same as if, in accordance with usual practice, the last parts were integral sections of the same block of wood. Consequently, the proper fit between the forepart and heel part and the proper size of the finished last are insured.

Having thus described my invention, what I claim as new and desire to secure by Letters Patent of the United States is:

1. That improvement in methods of making a two-part last which consists in forming a joint surface including a hinge-knuckle on a forepart block, forming a matching joint surface including a knuckle recess on a selected heel part previously turned, securing said surface of the forepart block against a counterpartal chuck surface of a copying lathe having a recess to receive and engage the hinge-knuckle, and turning a forepart from said block under control of a model having a joint section of the same shape and size as that of the selected heel part.

2. That improvement in methods of making a forepart for a two-part last which consists in filling the gap between the forepart and heel part of a hinge last to provide a rigid primary model of complete joint section, drilling the heel part thereof widthwise to provide a bore open at both ends, mounting said model on a rod extending through said bore and carried by the head stock of a copying lathe, turning a forepart block in said lathe under control of said primary model to generate a secondary model having a complete joint section but not a complete heel part, securing said secondary model against a face plate of a copying lathe, and turning a forepart under control of said secondary model.

3. That improvement in methods of making a forepart for a two-part hinge last which consists in filling the gap between the forepart and heel part of a similar last to provide a rigid primary model of complete joint section, drilling the heel part widthwise to provide a bore open at both ends, mounting said model on a rod extending through said bore and carried by the head stock of a copying lathe, mounting a forepart block in said lathe, turning a secondary model from said block including the joint section, forming a joint surface including a hinge-knuckle on another forepart block, securing said surface of the block against a counterpartal chuck surface of a lathe having a recess to receive and engage the knuckle, and turning a forepart from said block under control of said secondary model.

4. That improvement in methods of making lasts which consists in filling the gap between the forepart and heel part of a hinge last to provide a rigid primary model of complete joint section, turning a secondary model including the joint section from a forepart block under control of said primary model, forming a joint surface including a hinge knuckle on another forepart block, securing said surface of the block against a counterpartal chuck surface of a copying lathe having a recess to receive and engage said knuckle, securing said secondary model against a face plate cooperatively related to said chuck surface, turning a forepart from said block under control of said secondary model, and forming a complemental joint surface on a heel part at a distance from the back thereof equal to the difference between the length of said forepart and the prescribed over-all length of the last.

5. That improvement in methods of making a two-part last which consists in drilling a bore widthwise through a previously turned heel part having a joint surface, locating the heel part with respect to a boring tool by placing said bore on a locating fixture, boring a knuckle-recess in said joint surface by relatively feeding said tool and the heel part in a direction parallel with said bore, forming a matching joint surface and knuckle on a forepart block, securing said surface of the block against a chuck surface of a copying lathe having a recess to receive and engage said knuckle, and turning a forepart from said block under control of a model having a joint section of the same shape and size as that of said heel part.

LAURENCE E. TOPHAM.